United States Patent [19]

Malone

[11] Patent Number: 5,124,097
[45] Date of Patent: Jun. 23, 1992

[54] METHOD OF PROVIDING CLOSED-CELL POLYOLEFIN FOAM HAVING REDUCED BLOWING AGENT CONTENT TO THE END USER

[75] Inventor: Bruce A. Malone, Granville, Ohio

[73] Assignee: The Dow Chemical Company, Midland, Mich.

[21] Appl. No.: 652,764

[22] Filed: Feb. 8, 1991

[51] Int. Cl.$^5$ .............................................. B29C 67/22
[52] U.S. Cl. ...................................... 264/51; 264/148; 264/150; 264/321
[58] Field of Search ............. 264/148, 150, 321, 46.1, 264/51, 53

[56] References Cited

U.S. PATENT DOCUMENTS

| | | | |
|---|---|---|---|
| 3,573,152 | 3/1939 | Wiley et al. | 161/60 |
| 3,789,095 | 1/1974 | Winstead | 264/321 |
| 4,134,945 | 1/1979 | Milford et al. | 264/321 |
| 4,487,731 | 12/1984 | Kobayashi | 264/148 |
| 4,577,998 | 3/1986 | Dorrn | 264/321 |
| 4,640,933 | 2/1987 | Park | 264/DIG. 5 |
| 4,824,720 | 4/1989 | Malone | 428/294 |

Primary Examiner—W. Gary Jones
Assistant Examiner—Allan R. Kuhns
Attorney, Agent, or Firm—J. Robert Dean, Jr.

[57] ABSTRACT

A method of providing closed-cell polyolefin foam having reduced blowing agent content to an end user including (a) extruding the polyolefin to form the essentially continuous foam structure defining a multiplicity of channels extending generally longitudinally therethrough; (b) intermittently crimping the essentially continuous foam structure such that the channels extending therethrough are intermittently substantially closed off; (c) intermittently severing the essentially continuous, intermittently crimped foam structure at the crimps therein to form discrete foam structure portions having crimped end portions; (d) cooling the crimped, discrete foam structure portions to an extent sufficient to prevent substantial shrinkage of the crimped, discrete foam structure portions upon initiation of release of the flammable blowing agent from the foam; (e) excising the crimped end portions from the remainder of the crimped, discrete foam structure portions to initiate release of the flammable blowing agent and form uncrimped, discrete foam structure portions; and (f) providing the uncrimped, discrete foam structure portions to the end user.

12 Claims, 4 Drawing Sheets

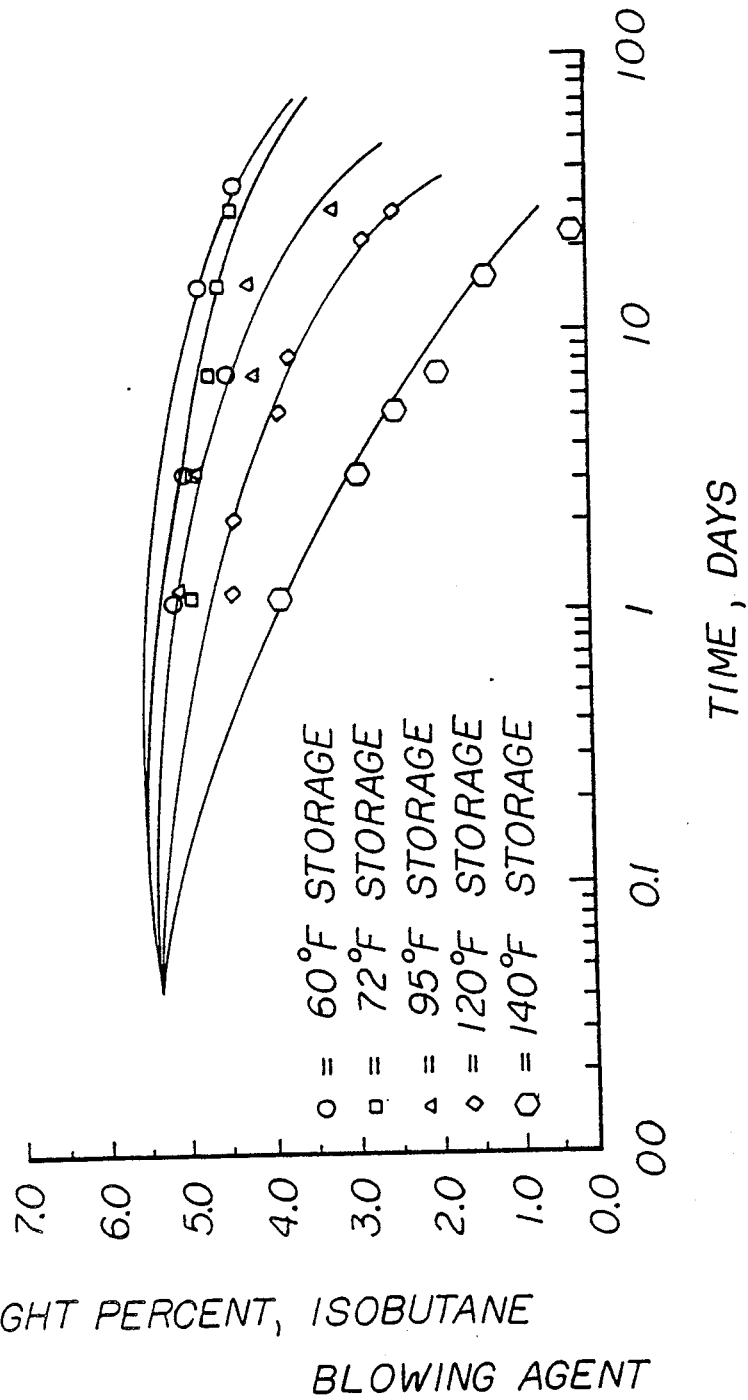
Fig. 3 BLOWING AGENT RETENTION, SOLID POLYETHYLENE FOAM PLANK (NOT AN EXAMPLE OF THE PRESENT INVENTION)

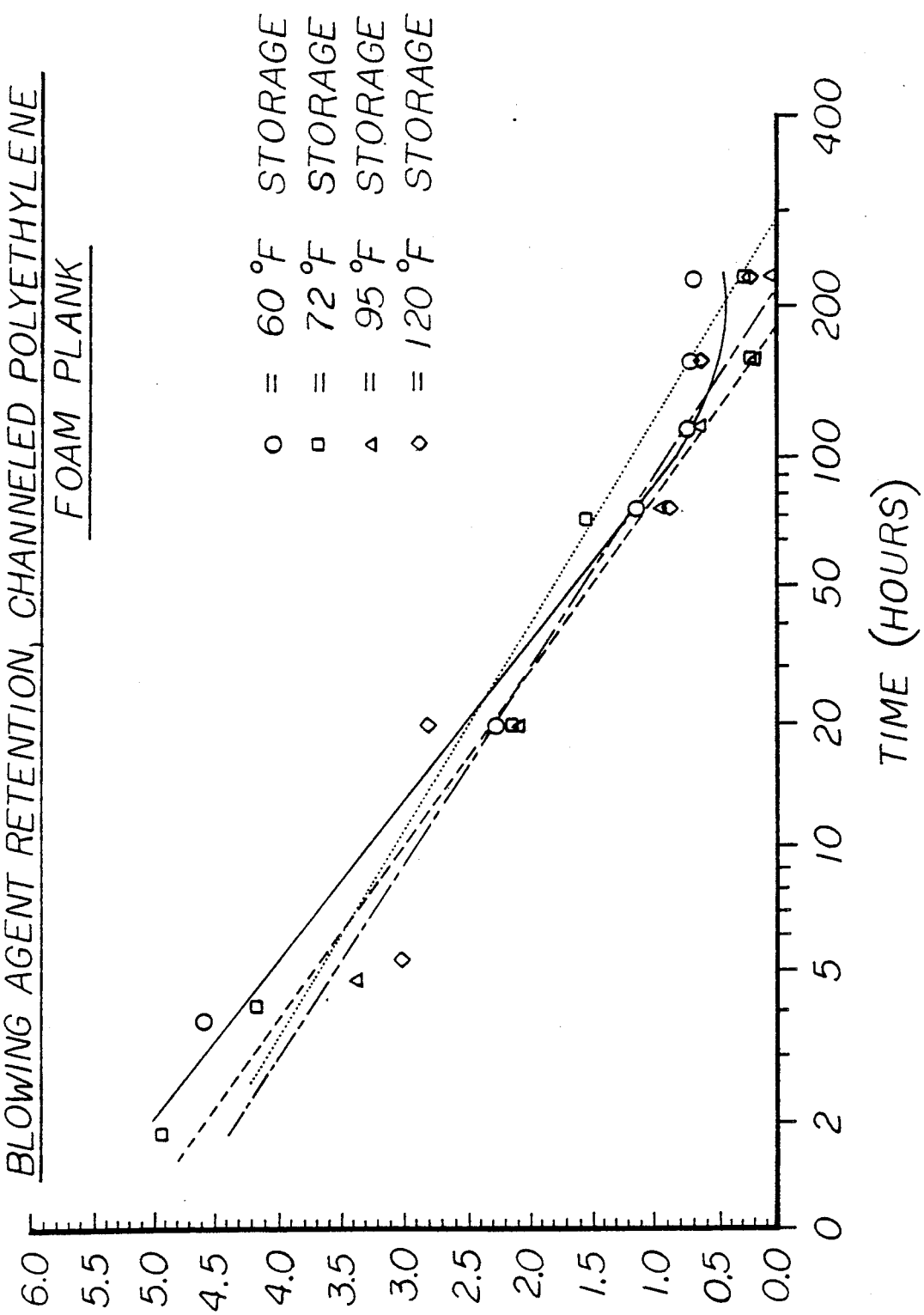

METHOD OF PROVIDING CLOSED-CELL POLYOLEFIN FOAM HAVING REDUCED BLOWING AGENT CONTENT TO THE END USER

BACKGROUND OF THE INVENTION

Environmental concerns over depletion of the ozone in the atmosphere have prompted calls for the elimination of chlorofluorocarbons as blowing agents for closed-cell polyolefin foams. Hydrocarbons, which are not known to have ozone depletion potential, are currently being studied as alternatives to chloroflourocarbons.

Hydrocarbons and other flammable blowing agents present their own unique set of problems in use as a blowing agent for closed-cell polyolefin foams. Chief among these is their relatively slow permeation from the foam. Slow permeation out of the foam results in slow decrease in flammable blowing agent content in the foam. The more flammable blowing agent entrapped in the foam, the more flammable the foam.

One means of accelerating permeation or release of flammable blowing agent from polyolefin foam is to extrude a foam structure having channels extending longitudinally therethrough such as seen in U.S. Pat. Nos. 3,573,152 and 4,824,720, neither of which appreciated the advantage of accelerated blowing agent release. The channels provide enhanced gaseous exchange between the interior of the foam structure and the environment outside of it.

Closed-cell polyolefin foam structures having channels therethrough present processing problems because too much of the blowing agent is lost too quickly upon severance of newly-extruded continuous foam structure into discrete foam structure portions at the time of manufacturing. Severance of the continuous foam structure into discrete portions exposes the open ends of the channels in the discrete portions causing the discrete portions to shrink to an unacceptable degree due to rapid loss of blowing agent.

Current manufacturing processes address the problem of foam structure shrinkage by intermittently crimping the continuous foam structure, and severing the continuous foam structure in the middle of the crimps to form crimped discrete foam structure portions. The crimps effectively seal off the ends of the crimped discrete portions, and, thus, the open ends of the channels within. The end user may excise or remove the crimps from both ends of the crimped portions before using them. The problem of shrinkage is avoided because the discrete portions have long since cooled to an extent sufficient, i.e., below the melting point of the polyolefin comprising the foam, that the discrete portions can maintain their form despite the loss of blowing agent.

Disadvantages of crimping the foam structure include inconvenience to the end user in having to excise the crimps from the foam structure portions, and delayed release of flammable blowing agent from the foam structure until time of actual use of the structure.

It would be desirable to have a method for more quickly releasing hydrocarbons and other flammable blowing agents from closed-cell polyolefin foams. It would be further desirable to have a method for quickly releasing such blowing agents from closed-cell polyolefin foams wherein removal of crimps by the end user is eliminated.

SUMMARY OF THE INVENTION

According to the present invention there is a method of providing closed-cell polyolefin foam having reduced blowing agent content to an end user comprising (a) extruding a foamable polyolefin composition to form an essentially continuous foam structure defining a multiplicity of channels extending generally longitudinally therethrough; (b) intermittently crimping the essentially continuous foam structure such that the channels extending therethrough are intermittently substantially closed off; (c) intermittently severing the essentially continuous, intermittently crimped foam structure at the crimps therein to form discrete foam structure portions having crimped end portions; (d) cooling the crimped, discrete foam structure portions to an extent sufficient to prevent substantial shrinkage of the crimped, discrete foam structure portions upon initiation of release of the blowing agent from the foam; (e) excising the crimped end portions from the remainder of the crimped, discrete foam structure portions to initiate release of the flammable blowing agent and form uncrimped, discrete foam structure portions; and (f) providing the uncrimped, discrete foam structure portions to the end user.

BRIEF DESCRIPTION OF THE DRAWINGS

The novel features of the present invention and the context within which they are set will be better understood upon reviewing the following specification together with the drawings.

FIG. 3 is a plot of the data points of Table 2 corresponding to the retention of blowing agent as a function of time in a discrete foam structure portion not made in accordance with the present invention.

FIG. 4 is a plot of the data points of Table 3 corresponding to the retention of blowing agent as a function of time in a discrete foam structure portion made in accordance with the present invention.

DETAILED DESCRIPTION

Figure 1:
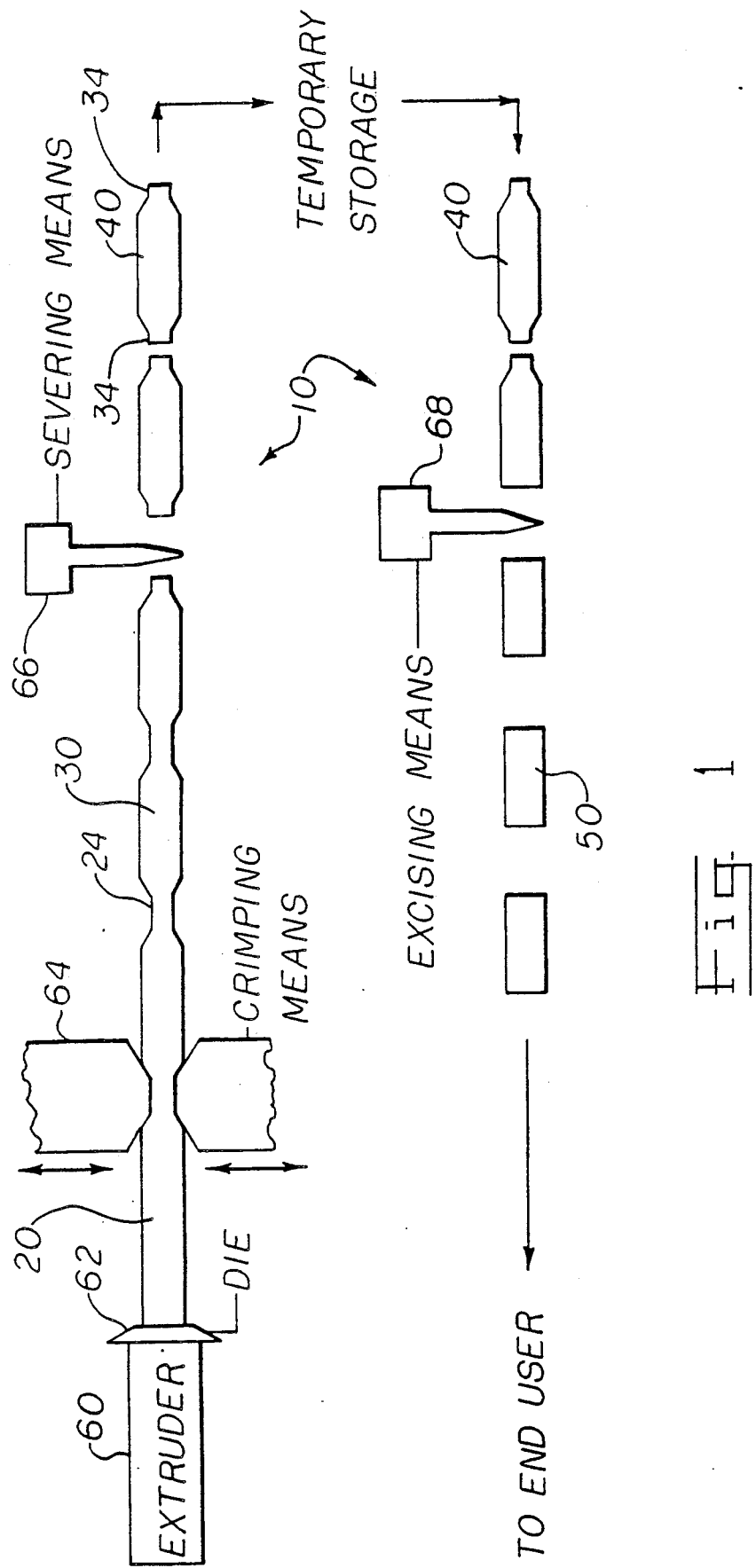
FIG. 1 is a schematic view of a process for making discrete foam structure portions utilizing the method of the present invention for releasing flammable blowing agents from the foam structure.

The method of the present invention may be better understood in reference to the process for making a closed-cell, polyolefin foam structure and providing it to the end user, which is referenced generally by the numeral 10, and is represented in FIG. 1. The method provides a means for releasing a flammable blowing agent from the foam structure so that the blowing agent content is substantially reduced by the time the foam structure reaches the end user.

Figure 2:
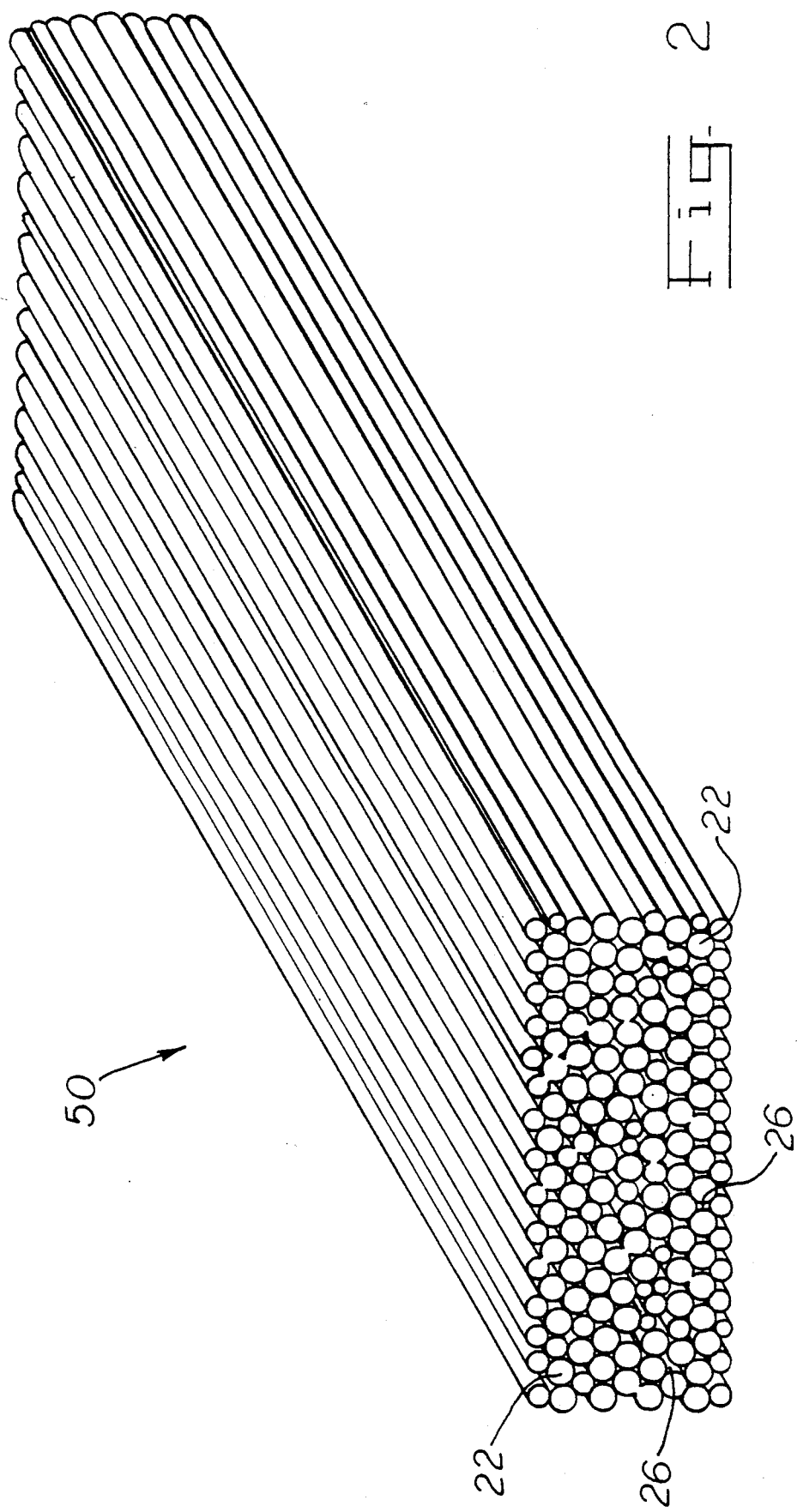
FIG. 2 is an oblique view of the discrete foam structure portion of FIG. 1.

Referring to FIGS. 1 and 2, a foamable polyolefin composition (not shown) is extruded through a die 62 having a multiplicity of orifices therein (not shown) to form a plurality or multiplicity of foam strands 22 which coalesce and adhere to form an essentially continuous, closed-cell foam structure 20 defining a multiplicity of channels 26 extending generally longitudinally therethrough in the machine direction. Foam structure 20 is then contacted intermittently along its length by a crimping means 64 to form an essentially continuous, crimped foam structure 30 having crimps 24 therein. Crimping means 64 pinches foam structure 30 to substantially close off channels 26 at crimps 24. Foam structure 30 is intermittently severed by a severing means 66 at crimps 24 to form discrete foam structure portions 40 having crimped end portions 24, which substantially close off channels 26 extending through foam structure portions 40. Foam structure portions 40 are sent to storage for cooling or are otherwise allowed to cool to an extent sufficient to prevent substantial shrinkage of portions 40 upon initiation of release of the flammable blowing agent from portions 40. After cooling, crimped end portions 24 are excised from the remainder of foam structure portions 40 by excising means 68 to initiate release of the flammable blowing agent and form uncrimped, discrete foam structure portions 50. Excising end portions 24 exposes the end portions of channels 26 in foam structure portions 50 causing release of the flammable blowing agent. Foam structure portions 50 are then provided to the end user.

In the present method, the foams structure is preferably formed by extrusion forming of a molten polyolefin composition utilizing a die containing a multiplicity of orifices. The orifices are arranged so that contact between adjacent streams of the molten extrudate occurs during the foaming process and the contacting surfaces adhere to one another with sufficient adhesion to result in a unitary foam structure. Desirably, the individual strands of coalesced polyolefin foam should remain adhered into unitary structure to prevent strand delamination under stresses encountered in preparing, shaping, and using the foam. Apparatuses and methods for producing foam structures having channels therethrough are seen in U.S. Pat. Nos. 3,573,152 and 4,824,720, both of which are incorporated herein by reference.

Blending of various components in the method of the present invention in order to provide suitable foamable polyolefin compositions for melt extrusion to prepare desirable foams is accomplished according to known techniques in the art. Suitably, a mixer, extruder, or other suitable blending device is employed to obtain a homogeneous melt. The extruder or other suitable blending device is then employed to incorporate a blowing agent. Nucleating agents, extrusion aids, antioxidants, colorants, pigments, etc. may also be incorporated as desired.

The orifices in the die through which the molten extrudate is passed may take on a circular shape or a noncircular shape. Suitable noncircular shapes include X-shaped, cross- or star-shaped, or polygonal-shaped. The various orifices in the die may be specially arranged in a desired configuration or array such as a sine wave, honeycomb, square sawtooth, or a triangular sawtooth wave pattern.

The streams of expanded polyolefin foam exiting the orifices in the die may take the form of strands, which desirably coalesce and adhere to one another to form a unitary structure. The strands will vary in cross-sectional shape according to the shape of the orifices in the die. The strands may be the same or different cross-section than the foam structure which they coalesce to form. Preferably, the individual strands, have a major dimension in cross-section of between about 0.5 and about 10 mm and most preferably between about 1.0 and about 5.0 mm.

The channels within the foam structure extend longitudinally therethrough in the machine direction. The channels may take any cross-sectional shape which provides gaseous communication between the interior of the foam structure and the environment outside of same. The channels may take a cross-sectional shape which is circular, rectangular, square, polygonal, or closed curve of any description.

The crimping means intermittently contacts the essentially continuous foam structure to form crimps therein while the structure is still in a plastic deformable state to substantially close off the channels extending through the structure. The crimping means may take the form of any mechanical device which is capable of stressing the essentially continuous foam structure to an extent sufficient to form crimps therein. Preferably, the crimping means takes the form of opposing, converging platens as shown in FIG. 1.

The essentially continuous, crimped foam structure is intermittently contacted and severed by the severing means at the crimps therein to form crimped, discrete foam structure portions having crimped end portions. The location of severing at the crimps is not critical as long the crimped, discrete foam structure portions are crimped at their ends to a degree sufficient to ensure that substantial amounts of flammable blowing agent do not escape. Preferably, the essentially continuous, crimped foam structure is intermittently severed in about the middle of the crimps.

The severing means may take the form of any means known in the art for severing or cutting foams such as hot wires or cutting instruments. A preferred means of severing is a moving knife blade.

The crimped foam structure portions are sent to temporary storage for cooling or are otherwise allowed to cool to an extent sufficient to prevent substantial shrinkage of the foam structure upon initiation of release of the flammable blowing agent upon removal or excising of the crimped end portions from the crimped foam structure portions. The entire foam structure portion need not be of a uniform temperature, but needs to be sufficiently low in any given region of the portion such that the structure will not substantially shrink upon release of the blowing agent. Desirably, the crimped foam structure portions are cooled to about 50° C. below the melting point of the polyolefin comprising the foam of the foam structure portions. Though desirable cooling points will vary according to the polyolefin, a cooling point range of between about 30° C. and about 60° C. is typical for most polyethylenes, and a cooling point range of between about 80° C. and about 120° C. is typical for most polypropylenes.

After the crimped foam structure portions are cooled to an extent sufficient to prevent substantial shrinkage, the crimped end portions are removed or excised from the remainder of the crimped foam structure portions to form uncrimped, discreet foam structure portions. A consequence of the excising of the crimped end portions is that the end portions of the channels within the resulting uncrimped foam structure portions are exposed to the outside environment providing gaseous communication between the interior of the uncrimped foam structure portions and such environment initiating release of blowing agent therefrom.

The excising means utilized to excise the crimped end portions from the crimped foam structure portions may take any form known in the art for cutting foam such as hot wires or cutting instruments. A preferred excising means is a moving knife blade. The excising means and the severing means described above may or may not take the same form.

Initiation of release of flammable blowing agent at the time of manufacture of the uncrimped foam structure portions is an important aspect of this invention because the blowing agent content of such portions is reduced from what it would be if crimped foam structure portions were provided to end users as in the prior art. The providing of crimped foam structure portions made with a flammable blowing agent to end users means that initiation of release of such blowing agent would not commence until the end user himself removed the crimped end portions. Thus, the flammability of the crimped foam structure portions provided to the end user would be higher than for the uncrimped foam structure portions provided to the end user in accordance with the present invention.

Upon formation of the uncrimped, discreet foam structure portions and the concommitant initiation of release of flammable blowing agent, the portions are provided to the end user of such portions. As stated above, initiation of release of blowing agent prior to providing the uncrimped foam structure portions to the end user results in portions with lower flammable blowing agent content than would be the case if the end user removed the crimped end portions himself. Optionally, the uncrimped, discreet foam structure portions may be held for some period of time by the manufacturer to allow the blowing agent content to decrease even further before they are provided to the end user. The end user is the party that actually uses the uncrimped foam structure portions in end use applications. Typical applications include insulation, cushioning, and packaging.

Suitable foamable polyolefin compositions include polyethylene or polypropylene. Preferred are copolymers of ethylene or propylene and a monoethylenically unsaturated polar monomer copolymerizable therewith, especially carboxyl-containing comonomers. Examples include copolymers of ethylene and acrylic acid or methacrylic acid and $C_{1-4}$ alkyl ester or ionomeric derivatives thereof; ethylene vinyl-acetate copolymers; ethylene/carbon monoxide copolymers; anhydride containing olefin copolymers of a diene and a polymerizable; copolymers of ethylene and an $\alpha$-olefin having ultra low molecular weight (i.e., densities less than 0.92); blends of all of the foregoing resins; blends thereof with polyethylene (high, intermediate or low density); etc. Particularly preferred compositions are copolymers of ethylene and acrylic acid, (EAA copolymers) having up to about 30 percent by weight of copolymerized acrylic acid; ionomeric derivatives of the foregoing, copolymers of ethylene and vinyl acetate ultra low density polyethylene: and blends of the foregoing with one another and with low density polyethylene.

The polymers of ethylene and a polar comonomer may be prepared by known addition polymerization techniques, or by a grafting reaction of the reactive comonomer with a preformed polymer of ethylene. Additional elastomeric components such as polyisobutylene, polybutadiene, ethylene/propylene copolymers, and ethylene/propylene/diene interpolymers may be included in the blend if desired. Moreover, additional components such as crosslinking agents designed either to provide latent crosslinking of the ethylenic polymer, such as silane functional crosslinking agents or covalent or ionic crosslinking agents, may be included if desired.

A most preferred resin composition comprises a copolymer of ethylene and acrylic acid or ethylene and vinyl acetate containing from about 85 percent to about 98 percent ethylene. A most preferred thermoplastic composition is a homogeneous, random copolymer of ethylene and acrylic acid. Copolymer of ethylene and acrylic acid or of ethylene and vinyl acetate may be obtained from The Dow Chemical Company. Ethylene vinyl acetate copolymer may also be obtained under the tradename Elvax from E. I. duPont deNemours & Company. Anhydride modified copolymers of ethylene are available under the tradename Plexar from Norchem, Inc. Ionomeric copolymers are available under the tradename Surlyn ® from E. I. duPont deNemours & Company.

Preferred polyolefin compositions useful in foam structures made using the method of the present invention have a heat seal strength of at least 3.0 Newtons/inch width when the thermoplastic resin is in the film form. "Heat seal strength" is defined for use herein as the adhesion generated between two film surfaces caused to adhere to one another by application of 40 lbs/in$^2$ (276 kilopascals) pressure for 1.0 sec. at the temperature being tested followed by cooling the film/film laminate for one minute. Such heat sealing may be performed by a Sentinei ® Hot Tack machine, model #12ASL. Bond Strength (Heat Seal Strength) is the force in Newtons/inch width required to cause tearing of at least 50 percent of the seal area by 180° pull testing. The test constitutes a modification of Dow heat seal test #FS-222 and ASTM F-88. Films of the various materials to be tested may be prepared by placing pellets of the appropriate resin between polyethylene terephthalate sheets placed in a 10 inch × 2 inch (25 centimeters by 5.1 centimeters) press heated to 180° C. After one minute preheating, the pellets are compressed under a pressure of 5,000 lbs/in$^2$ for three minutes, cooled, and cut into 1 inch × 10 inch (2.5 centimeters by 25 centimeters) strips. Film thickness from 0.004 to 0.006 inches (0.10–0.15 mm) result.

Flammable blowing agents useful in the present invention may be mixture of one or more flammable blowing agent components, and include any nonflammable blowing agent components such as nitrogen, carbon dioxide, water, air, etc. comprising the balance of the blowing agent. For purposes of this invention, a flammable blowing agent is one that has a lower flammable limit of less than about 4 percent by volume in air according to ASTM 681-85 test. Flammable blowing agents are preferably hydrocarbons such as alkyl halides, e.g. methyl chloride and ethyl chloride, and alkenes or alkanes from 2 to 9 carbon atoms. More preferred are alkanes such as butane, isobutane, pentane, isopentane, hexane, and the like. A most preferred blowing agent is isobutane due to its desirable blowing agent properties. In the present invention, the blowing agent preferably comprises 100 percent isobutane.

Suitable uncrimped, discreet foam structure portions have gross densities (that is bulk densities or densities of the closed-cell foam including interstitial volumes between strands or profiles), preferably varying from about 0.2 to about 3.0 pounds per cubic foot (about 3.2 to about 48 kilograms per cubic meter). Most preferred portions have a density from about 1.0 to about 3.0 pounds per cubic foot (about 8.0 to about 45 kilograms per cubic meter). For specific uses in low weight cushioning applications a preferable alternate embodiment comprises portions having densities less than 2.0 lbs/ft$^3$ (32 kilograms per cubic meter). The individual strands of foam comprising the uncrimped, discreet foam structure portions preferably possess a local or strand density from about 0.5 to about 6.0 lbs/ft$^3$ (about 8.0 to about 96 kilograms per cubic meter), and most preferably from about 1.0 to 3.0 lbs/ft³ (about 16 to about 48 kilograms per cubic meter).

In the present closed-cell uncrimped, discreet foam structure portions, at least about 70 percent of the total number of cells in the foam are closed-cell as opposed to open-cell not including interstitial volumes between the foam strands comprising the foam structure.

The present method provides a means for producing essentially continuous polyolefin foam structures and discrete portions thereof without substantial shrinkage of the foam structure upon release of the blowing agent. An uncrimped, discreet foam structure portion free of substantial shrinkage is one wherein the portion does not shrink more than about 20 percent by volume and preferably not more than about 10 percent by volume one hour after removal of the crimped end portions compared to the volume of same prior to removal of the crimped end portions.

To further illustrate the present invention, a nonlimiting example of same is provided herebelow.

ILLUSTRATIVE EXAMPLE

The retention of a flammable blowing agent from a solid polyethylene foam plank and a polyethylene foam plank having channels therethrough (channeled plank) were compared by analysis of blowing agent level within the foam as a function of time. The solid plank was 2 inches by 7.3 inches (5.1 centimeters by 19 centimeters), and was extruded with a 3½ inch (8.9 centimeter) extruder operated at 400 pounds/hour (182 kilograms/hour) using 6.7 parts by weight of isobutane per hundred parts polyethylene. The channeled plank was prepared by extrusion through a multiorifice die using 11 parts by weight of isobutane per hundred parts by weight of polyethylene. The channeled foam plank was 3 inch by 12 inch (7.6 centimeters by 3.1 centimeters), and had channels 0.06 inch (0.15 centimeter) in diameter in the machine direction uniformly spaced 0.19 inches (0.48 centimeters) apart throughout the cross-section of the foam structure. Extruder operating conditions for the solid and the channeled plank are indicated in Table 1. Blowing agent level in the solid and channeled planks as a function of storage temperature was measured, and is represented in Tables 2 and 3 and FIGS. 3 and 4.

The channeled foam plank demonstrated significantly greater blowing agent release than the solid plank independent of foam thickness and storage temperature. It took approximately 200,000 hours at 72° F. (22° C.) and 2000 hours at 120° F. (49° C.) to reach about 0 percent flammable blowing agent level (below detectable limit) within the cells of the foam of the solid plank. It took approximately 200 hours to reach about 0 percent flammable blowing agent level (below detectable limit) within the cells of the foam of the channeled plank. Therefore, the blowing agent escape rate is a minimum of at least 10 times faster and possibly as much as 1000 times faster for the channeled foam plank than the solid foam plank.

TABLE 1

| Processing and Extruder Conditions | Solid Plank | Channeled Plank |
| --- | --- | --- |
| LDPE lb/hr | 250 | 300 |
| BA, | | |
| type | iC4 | iC4 |
| ratio | 100 | 100 |
| pph | 6.7 | 11 |
| P mod, | | |
| type | A129 | A129 |
| pph | 1.0 | 0.8 |
| Nucl, | | |
| type | talc | talc |
| pph | 0.60 | 0.67 |
| I1010, pph | 0.05 | 0.05 |
| Die Gap, in | 0.14 | |
| Die, | | |
| psi | 292 | 540 |
| ft/min | 19.5 | 11.0 |
| Cell Size, (millimeters) | | |
| V | 1.70 | 0.8 |
| H | 1.50 | 0.8 |
| E | 1.41 | 0.8 |
| Dimensions @ 7d, (millimeters) | | |
| T | 53.6 | 75 |
| W | 186 | 318 |
| Density, pcf @ time | | |
| 30 minutes | 2.30 | 2.11 |
| 1 hour | 2.55 | |
| 7 days | 2.31 | 1.85 |
| 30 days | 2.31 | — |

LDPE - low density polyethylene
Nucl - nucleator
P mod - permeability modifier (A 129 is ATME PA-129)
BA - blowing agent
I1010 - Irganox 1010 (Ciba-Geigy)
pcf - pounds per cubic foot
V - vertical direction
H - horizontal direction
E - extrusion direction
T - plank thickness
W - plank width

TABLE 2

SOLID PLANK
Weight Percent Blowing Agent (Isobutane) in Foam
(corresponds to Plot 1)

| Time | 60° F. | 72° F. | 95° F. | 120° F. | 140° F. |
| --- | --- | --- | --- | --- | --- |
| 1 day | 5.1 | 4.9 | 5.0 | 4.4 | 3.8 |
| 2 day | — | — | — | 4.4 | — |
| 3 day | 4.9 | 4.8 | 4.7 | — | 2.7 |
| 5 day | — | — | — | 3.8 | 2.4 |
| 7 day | 4.4 | 4.6 | 4.1 | — | 1.9 |
| 8 day | — | — | — | 3.7 | — |
| 14 day | 4.6 | 4.5 | 4.1 | — | 1.3 |
| 21 day | — | — | — | 2.7 | 0.1 |
| 28 day | — | 4.3 | 3.1 | — | — |
| 35 day | 4.2 | — | — | — | — |

TABLE 3

CHANNELED PLANK
Weight Percent Blowing Agent (Isobutane) in Foam
(corresponds to Plot 2)

| Time | 60° F. | 72° F. | 95° F. | 120° F. |
| --- | --- | --- | --- | --- |
| 2 hrs | — | 4.9 | — | — |
| 4.0 hrs | 4.5 | — | — | — |
| 4.5 hrs | — | 4.2 | — | — |
| 5.0 | — | — | 3.4 | — |
| 5.5 | — | — | — | 2.9 |
| 20 hrs | 2.3 | 2.1 | 2.1 | 2.8 |
| 58 hrs | — | 1.5 | — | — |
| 75 hrs | 1.0 | 1.1 | 0.8 | 0.8 |
| 120 hrs | 0.7 | — | 0.6 | — |
| 160 hrs | 0.6 | 0.2 | 0.2 | 0.6 |
| 240 hrs | 0.7 | 0. | 0.0 | 0.2 |

While embodiments of the method and the foam of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A method of providing closed-cell polyolefin foam having reduced blowing agent content to an end user, comprising:
    a) extruding a foamable polyolefin comprising having a blowing agent to form an essentially continuous foam structure defining a multiplicity of channels extending generally longitudinally therethrough;
    b) intermittently crimping the essentially continuous foam structure such that the channels extending therethrough are intermittently substantially closed off;
    c) intermittently severing the essentially continuous, intermittently crimped foam structure at the crimps therein to form discrete foam structure portions having crimped end portions;
    d) cooling the crimped, discrete foam structure portions to an extent sufficient to prevent substantial shrinkage of the crimped, discrete foam structure portions upon initiation of release of the blowing agent from the foam;
    e) excising the crimped end portions from the remainder of the crimped, discrete foam structure portions to initiate release of the blowing agent and form uncrimped, discrete foam structure portions; and
    f) providing the uncrimped, discrete foam structure portions to the end user.

2. The method of claim 1, wherein the blowing agent is a flammable blowing agent.

3. The method of claim 2, wherein the flammable blowing agent comprises an alkane containing from two to nine carbon atoms.

4. The method of claim 3, wherein the alkane is isobutane.

5. The method of claim 2, wherein the flammable blowing agent is a hydrocarbon.

6. The method of claim 2, wherein the flammable blowing agent is selected from the group consisting of alkyl halides and alkenes of from 2 to 9 carbon atoms.

7. The method of claim 1, wherein the channels have an average major dimension of from about 0.002 to about 0.2 inches, and are spaced up to an average of about 0.5 inches apart.

8. The method of claim 1, wherein the crimped, discrete foam structure portions are cooled to about 50° C. below the melting point of the polyolefin comprising the crimped, discrete foam structure portions.

9. The method of claim 1, wherein the foam structure is severed to expose the end portions of the channels at the ends of the foamed structure portions to provide gaseous communication between the interior of the foam structure portions and the environment outside of the portions.

10. The method of claim 1, wherein the uncrimped, discrete foam structure portions have a density of from about 0.5 to about 4.0 pounds per cubic foot.

11. The method of claim 1, wherein the polyolefin is selected from the group consisting of polyethylene, copolymers of ethylene and monoethylenically unsaturated comonomers, polypropylene, copolymers of propylene and monoethylenically unsaturated comonomers, and mixtures of two or more of the foregoing.

12. The method of claim 1, wherein the expandable polyolefin composition is extruded in the form of a plurality of individual strands which coalesce and adhere to one another to form the essentially continuous foam structure.

* * * * *